(12) United States Patent
Wadman et al.

(10) Patent No.: US 9,373,009 B2
(45) Date of Patent: Jun. 21, 2016

(54) TAG CLUSTERS FOR SILENT TAGS

(71) Applicant: Sony Corporation, Tokyo (JP)

(72) Inventors: Johan Wadman, Lund (SE); Peter Ljung, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/434,567

(22) PCT Filed: Feb. 21, 2014

(86) PCT No.: PCT/JP2014/000923
§ 371 (c)(1),
(2) Date: Apr. 9, 2015

(87) PCT Pub. No.: WO2015/125174
PCT Pub. Date: Aug. 27, 2015

(65) Prior Publication Data
US 2016/0026832 A1  Jan. 28, 2016

(51) Int. Cl.
*G06K 7/10* (2006.01)
*G06K 17/00* (2006.01)
*G06F 17/30* (2006.01)

(52) U.S. Cl.
CPC ...... *G06K 7/10009* (2013.01); *G06F 17/30598* (2013.01); *G06K 17/0029* (2013.01)

(58) Field of Classification Search
CPC .......... G06K 7/10009; G06K 19/0723; G06F 17/30598
See application file for complete search history.

(56) References Cited

U.S. PATENT DOCUMENTS

2012/0117389 A1* 5/2012 Sarmenta ........... G06K 19/0723
713/190
2013/0300544 A1  11/2013 Kamel

OTHER PUBLICATIONS

International Search Report and Written Opinion of the International Searching Authority, PCT Application No. PCT/JP2014/000923, Oct. 23, 2014, 11 pages.

* cited by examiner

*Primary Examiner* — Curtis Odom
(74) *Attorney, Agent, or Firm* — Myers Bigel & Sibley, P.A.

(57) ABSTRACT

Tags may be grouped into a tag cluster to be represented by a master tag. Tag transmission reports may be received from one or more tag readers that receive wireless transmissions from a plurality of tags. Tag IDs corresponding to each tag of the plurality of tags in the tag transmission reports may be determined. A plurality of the tag IDs may be grouped into a tag cluster and one of the tag IDs may be selected as a master tag ID to represent the tag cluster. A control command may be transmitted to each tag of the tag cluster except for the master tag. The control command may instruct each tag of the tag cluster except the master tag to stop broadcasting wireless transmissions. The tags in the tag cluster will be represented by the master tag.

20 Claims, 11 Drawing Sheets

Tag Cluster Mapping Data Table 442

TAG CLUSTERS FOR SILENT TAGS

CROSS REFERENCE TO RELATED APPLICATION

This application is a 35 U.S.C. §371 national stage application of PCT International Application No. PCT/JP2014/000923, filed on 21 Feb. 2014, the disclosure and content of which is incorporated by reference herein in its entirety.

TECHNICAL FIELD

Embodiments of this invention relate to tag broadcast management.

BACKGROUND ART

Radio Frequency Identification (RFID) tags may be embedded in or attached to items that can store identification information and other details. Tags may be small devices, such as a label, with a miniature embedded antenna. A tag reader may interrogate the tag by transmitting an RFID signal, which energizes the embedded antenna to provide power for the tag to transmit a responsive RFID signal to the reader. Some tags may have a power source and/or circuitry to provide transmissions or broadcasts to be picked up by tag readers. Tag readers may be stationary or mobile.

RFID tags may be used to gather information for many commercial and consumer purposes. However, considering the increase in the number of tags, it is possible to exhaust available spectral bandwidth if many tags are broadcasting at the same location. Also, many tags have limited resources and frequent broadcasting may exhaust power supplies.

SUMMARY

According to some embodiments of the present invention, a tag management server for grouping a plurality of tags may include a processor, a communication interface coupled to the processor and a memory coupled to the processor that includes computer readable program code embodied in the memory that when executed by the processor causes the processor to perform operations. The operations may include receiving, at the communication interface, one or more tag transmission reports from one or more tag readers that receives wireless transmissions from the plurality of tags and determining a tag identification (ID) corresponding to each tag of the plurality of tags in the tag transmission reports. The operations may also include grouping a plurality of the tag IDs into a tag cluster and selecting one of the tag IDs as a master tag ID to represent the tag cluster. The operations may further include instructing the tag reader(s) to transmit a control command to each tag of the tag cluster except for a master tag corresponding to the master tag ID. The control command may instruct each tag of the tag cluster except the master tag to stop broadcasting wireless transmissions.

According to some embodiments, the one or more tag transmission reports includes a first transmission report comprising tag IDs for wireless transmissions from the plurality of tags, and the operations may further include receiving a second tag transmission report from the tag reader(s) including the master tag ID but not tag IDs of the other tags of the tag cluster. The operations may further comprise determining updated information of the master tag ID from the second tag transmission report and updating information stored at the tag management server for all tag IDs of the tag cluster based on the updated information of the master tag ID.

According to some embodiments, the control command may include instructions for each tag of the tag cluster except the master tag to listen for broadcasts from the master tag. The control command may also include a master priority list comprising a prioritized list of tag IDs of the tag cluster. A tag of the tag cluster may become the master tag according to a priority of the corresponding tag ID in the master priority list. The master priority list may include a plurality of alternate IDs for each tag ID in the master priority list (e.g., Master 1, ID 0, Master 1, ID 1, Master 1, ID 2, Master 2, ID 0, Master 2, ID 1, Master 2, ID 2). Each tag of the tag cluster that is not the master tag may listen for wireless transmissions of a highest priority tag ID and alternate ID. The control command may further include instructions for the master tag to broadcast during a broadcast time window and for any other tags to listen during the broadcast time window.

In some cases, a tag cluster or master tag may have an expiration time. For example, a tag cluster may live for up to 3 hours before the tag cluster expires or a new master tag is selected. At this point, a highest priority master tag alternate identity is discarded and a new master or new alternate identity of a master is selected.

According to some embodiments, the operations further comprise instructing the tag reader to transmit a wake command to the master tag, the wake command instructing the master tag to include a wake up flag in a wireless transmission to cause other tags of the tag cluster not broadcasting wireless transmissions to resume broadcasting wireless transmissions.

According to some embodiments, a mobile communication terminal for grouping a plurality of tags may include a processor, a communication interface coupled to the processor and a memory coupled to the processor that includes computer readable program code embodied in the memory that when executed by the processor causes the processor to perform operations. The operations may include receiving, at the communication interface, wireless transmissions from the plurality of tags, determining a tag ID corresponding to each tag of the plurality of tags from the wireless transmissions, grouping a plurality of the tag Ws into a tag cluster, selecting one of the tag IDs as a master tag ID to represent the tag cluster, and transmitting a control command to each tag of the tag cluster except for a master tag corresponding to the master tag ID, the control command instructing each tag of the tag cluster except the master tag to stop broadcasting wireless transmissions.

According to some embodiments, the wireless transmissions of the plurality of tags may include tag IDs, and the operations may further include receiving wireless transmissions from the master tag but not from other tags of the tag cluster. Operation may also include determining updated information of the master tag ID from the wireless transmissions from the master tag and updating information stored at the mobile communication terminal for all tag IDs of the tag cluster based on the updated information of the master tag ID.

According to some embodiments, the control command may include instructions for each tag of the tag cluster except the master tag to listen for broadcasts from the master tag. The control command may also include a master priority list comprising a prioritized list of tag IDs of the tag cluster. A tag of the tag cluster may become the master tag according to a priority of the corresponding tag ID in the master priority list.

According to some embodiments, a tag may include a communication interface coupled to the processor that is configured to receive and transmit wireless transmissions and a digital logic circuit configured to perform operations. The operations may include broadcasting wireless transmissions comprising a tag ID of the tag responsive to receiving signals from a tag reader, receiving a control command from the tag reader, preventing, responsive to the control command, further broadcasting of wireless transmissions in response to signals received from the tag reader, and receiving wireless transmissions from a master tag appointed to represent the tag and other tags that form a cluster of tags.

According to some embodiments, the operations may further include resuming broadcasting of the wireless transmissions responsive to no longer detecting wireless transmissions from the master tag within a listening time window. The operations may further include widening the listening time window responsive to no longer detecting wireless transmissions from the master tag during the listening time window. The operations may also include narrowing the listening time window responsive to receiving wireless transmissions from a new master tag during the widened listening time window.

According to some embodiments, the control command may include a master priority list comprising a prioritized list of tag IDs, and the operations may further include listening for wireless transmissions from a tag having a tag ID matching a highest priority tag ID in the master priority list and, responsive to detecting no wireless transmissions from the master tag having a tag ID matching a highest priority tag ID in the master priority list during a listening time window, discarding the highest priority tag ID in the master priority list and listening for wireless transmissions from a tag having a tag ID matching a new highest priority tag ID in the master priority list. The operations may also include broadcasting wireless transmissions responsive to detecting no wireless transmissions from a tag having a tag ID matching a priority tag ID in the master priority list during the listening time window.

According to some embodiments, the master priority list may include a plurality of alternate IDs for each tag ID in the master priority list, and the operations may further include listening for wireless transmissions from a tag having a tag ID and an alternate ID matching a highest priority tag ID and alternate ID in the master priority list and, responsive to detecting no wireless transmissions from the master tag having a tag ID and an alternate ID matching a highest priority tag ID and alternate ID in the master priority list during the listening time window, discarding the highest priority tag ID and alternate ID in the master priority list and listening for wireless transmissions from a tag having a tag ID matching the highest priority tag ID and a new alternate ID in the master priority list.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF DRAWINGS

The accompanying drawings, which are included to provide a further understanding of the invention and are incorporated in and constitute a part of this application, illustrate certain embodiment(s) of the invention.

DESCRIPTION OF EMBODIMENTS

Figure 1:
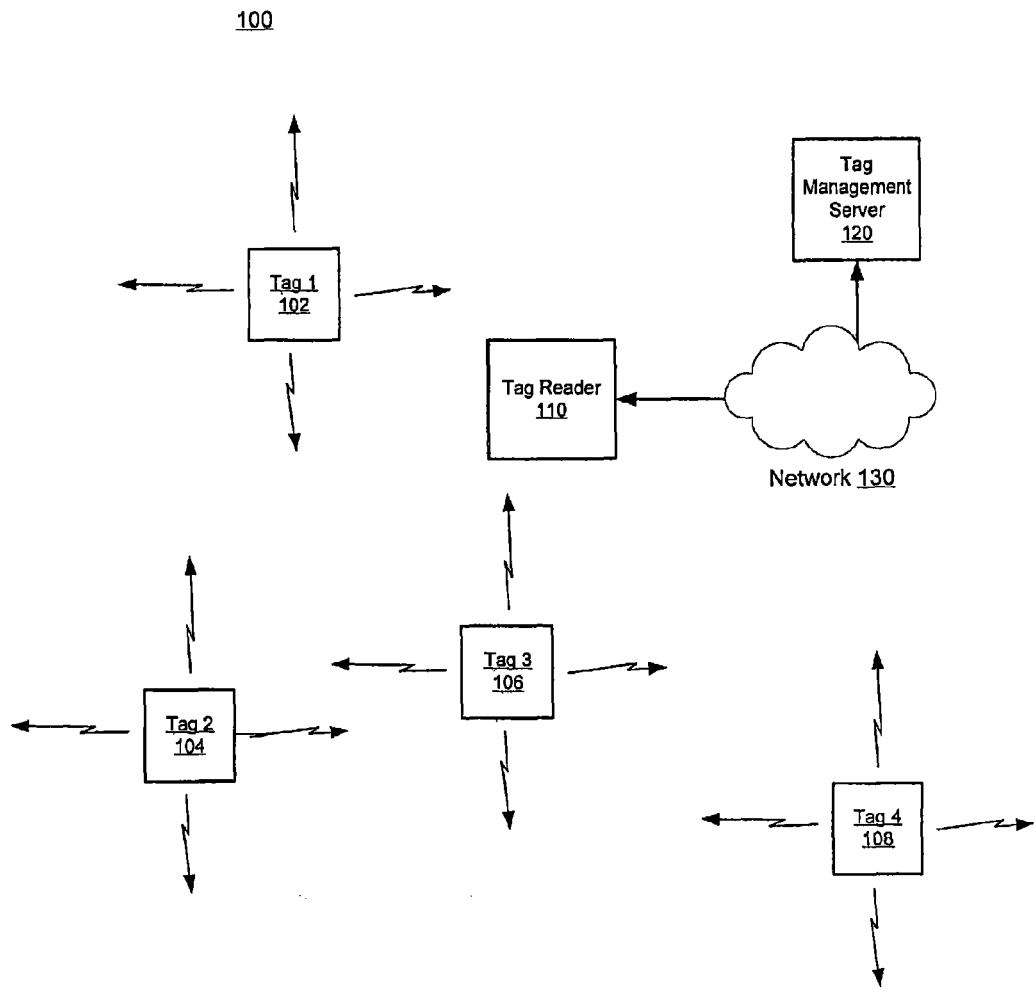
FIG. 1 is a schematic illustration of a tag reader receiving tag transmissions according to some embodiments of the invention.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "module," "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Tags may be used to track items or people for commercial or personal purposes. The tags may be attached to moveable objects and may be any shape/size that can be incorporated into/on the moveable objects. Moveable objects can include, without limitation, wallets, keys, bags, mobile telephones, clothing, automobiles or other moveable items. Tags may include devices, labels or printed inks on paper.

However, considering a large number of tags, it is possible to exhaust available spectral bandwidth if many tags are broadcasting at the same location. Depending on the broadcast frequency, the number of simultaneous tags may be limited (maybe in the hundreds). For example, a large parking lot could host several hundred tags in each of the automobiles, all broadcasting in a small area and thereby overloading the available spectral bandwidth. Also, many tags have limited power resources and frequent broadcasting may exhaust small power supplies.

Embodiments described herein may improve the power efficiency of tags (10+ times depending of density of tags at a single location), improve the power efficiency of tag readers (e.g. phone), improve anonymity of tags, and/or improve spectral efficiency (to allow more tags at a single location) by using smart clustering techniques to enable these improvements.

FIG. 1 illustrates a diagram 100 of tags 102-108 that may transmit wireless signals or broadcasts. Tags may transmit wireless signals, such as broadcasts with tag ID information. Many types of tags may lack a power source and transmit a tag ID as an inductive response to a received signal. Other tags may have a power source and/or include additional circuitry for receiving signals and processing commands. For example, FIGS. 2A-2C are block diagrams illustrating a tag 200 according to some embodiments.

Figure 2A:
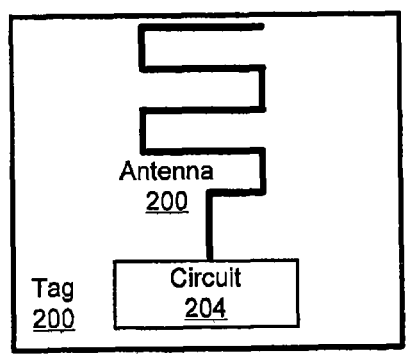
FIGS. 2A-2C are schematic block diagrams that illustrate a tag according to some embodiments.
Figure 2B:
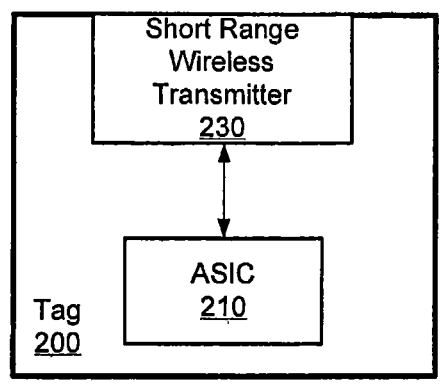
Figure 2C:
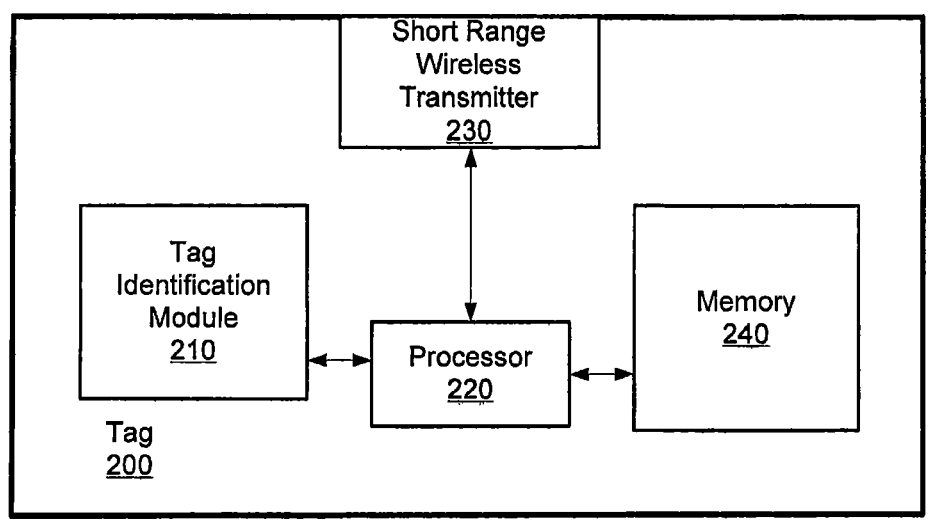
Figure 3:
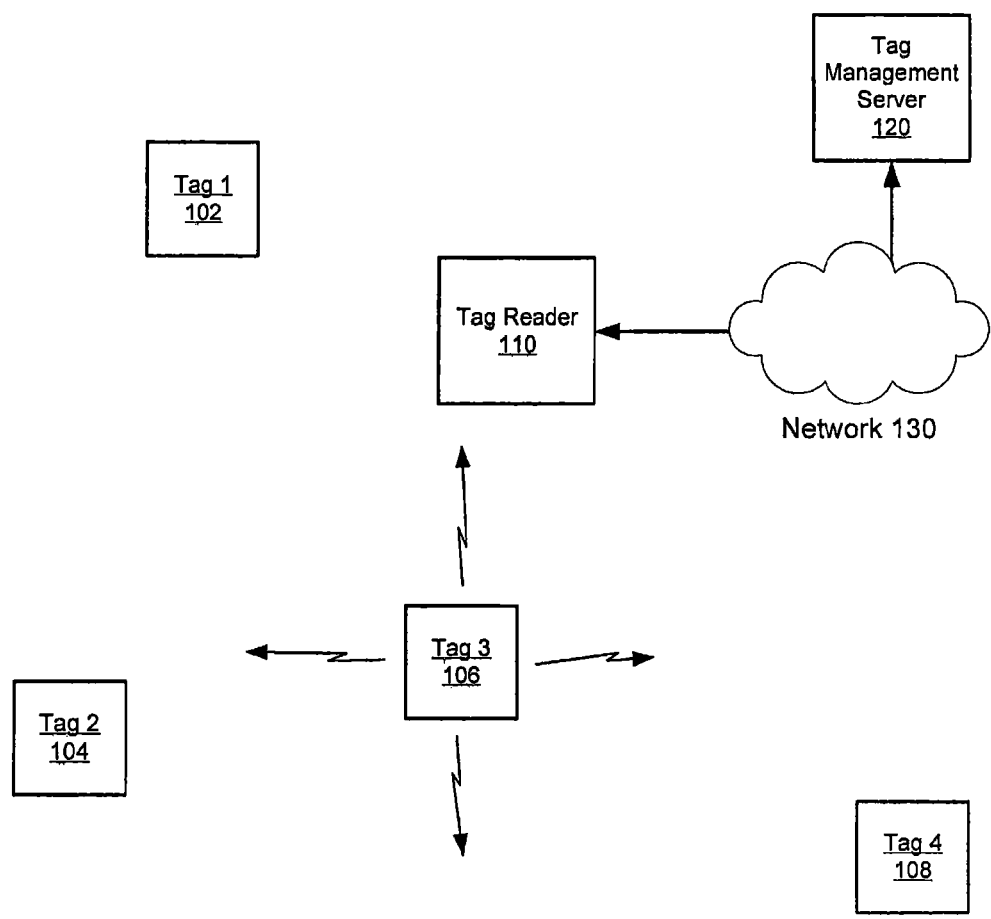
FIG. 3 is a schematic illustration of a master tag according to some embodiments.

FIG. 2A illustrates a block diagram of a simple tag which has an embedded antenna 200 that receives a tag reader signal that energizes tag 200 so that it may have power to transmit a responsive RED signal to the tag reader. Such a tag may also include a circuit 204 for transmitting a tag ID. For example, circuit 204 may include an NFC circuit (accessory NFC circuit) that can be powered by and communicate with a UE NFC circuit using short-range high frequency wireless communication technology which enables the exchange of data between devices over about a 10 cm distance, although the NFC circuits are not limited to operating in at any defined range. The communication protocol and operation can be an extension of the ISO 14443 proximity-card standard (contactless card, RFID) and can be specified in the ECMA-340 and ISO/IEC 18092 technology standards. Some embodiments of the NFC circuits may communicate using existing ISO 14443 smartcards and readers and can thereby be compatible with existing contactless communication infrastructure.

The NFC circuits may communicate via magnetic field induction. A loop antenna connected to the NFC circuit and a loop antenna of the accessory NFC circuit may be placed in close proximity to each other within the other's antenna near field, thereby effectively forming an air-core transformer. Some embodiments of the NFC circuits can transmit within the globally available and unlicensed radio frequency ISM band of 13.56 MHz, with a bandwidth of almost 2 MHz. Some embodiments of the NFC circuits can support data rates of 106, 212, or 424 kbit/s using a modified Miller coding or Manchester coding to encode and decode communicated data.

The accessory NFC circuit can be configured to operate in a passive communication mode, because the tag 200 does not have its own power source. In contrast, the UE NFC circuit can be configured to operate in an active communication mode if the tag 200 has a power source, e.g., rechargeable battery. When operating in the passive communication mode, the UE NFC circuit provides a carrier field and the accessory NFC circuit answers by modulating the carrier field. In this mode, the accessory NFC circuit generates its operating power from the NFC circuit provided electromagnetic field, thus making the accessory NFC circuit a transponder. In some other embodiments the accessory NFC circuit contains a power supply and is configured to operate in an active communication mode.

The NFC circuit includes a charging circuit that can become inductively coupled to the UE NFC circuit through the transceiver circuit to generate power therefrom, and which it provides to a transceiver circuit. The transceiver circuit transmits data through the antenna to the UE NFC circuit using the power from the charging circuit. The transceiver circuit may optionally be configured to receive data through the antenna from the UE NFC circuit.

As illustrated in FIG. 2B, tag 200 may include a short-range wireless transmitter 230. Transmitter 230 may include a transmitter circuit to transmit radio frequency communication signals via an antenna system. The antenna system may include an antenna feed structure and one or more antennas. In some embodiments, transmitter 230 may include a transceiver circuit that is operative to also receive communication signals. Tag 200 may include an Application Specific Integrated Circuit (ASIC) circuit 210 or an NFC circuit for transmitting a tag ID and/or for other logic operations.

In some cases, as shown in FIG. 2C, tag 200 may also include a processor 220 that includes circuits for overall operation of the tag 200 including coordination of communications via transmitter 230. Processor circuit 220 may be configured to communicate data over the transmitter 230 according to one or more short range wireless communication protocols, such as Bluetooth (registered trademark) protocols, ANT protocols, WLAN protocols (e.g., 802.11a, 802.11b, 802.11e, 802.11g, and/or 802.11i), or other short range wireless communication protocols. The transmitter 230 may be, for example, a low power Bluetooth (registered trademark) protocol transmitter or an ANT protocol transmitter, such as those designed and marketed by Dynastream Innovations Inc., a Cochrane, Canada based company. This tag 200 may also have an NFC circuit.

The processor 220 may be implemented using a variety of hardware and software. For example, operations of the processor 220 may be implemented using special-purpose hardware, such as an ASIC, and/or programmable logic devices such as gate arrays, and/or software or firmware running on a computing device such as a microprocessor, microcontroller or digital signal processor (DSP).

Tag 200 may also include a tag identification module 210 that operates with memory 240 to store identification information, such as a unique tag ID. The tag ID may also uniquely identify a moveable object attached to the tag. For example, two different moveable objects can have respective tags that each store different ID information that can be used to distinguish the two moveable objects. In some embodiments, tag 200 may have a power source or may be connected to a power source.

As shown in FIG. 1, a tag sensor, such as tag reader 110, may receive wireless transmissions from tags 102-108. In some embodiments, tag reader 110 may be a mobile communication terminal. A mobile communication terminal may be, for example, a smart phone, Personal Data Assistant (PDA), laptop, tablet, scanner or any other mobile computing device that may have capabilities including cellular telecommunication, Internet/intranet access, and/or a global positioning system (GPS) service. The mobile communication terminal may also support Wi-Fi communication over a local wireless network or the like. While tag sensors are generally described herein as mobile devices moving into proximity of a movable object being located, it will be understood that the tag sensors may also be non-mobile devices having locations associated therewith that detect movement of a movable object into their proximity (i.e., within range of a short range wireless protocol network supported by the tag sensor).

Tags may be registered. Tag registration may be used to connect the owner of a tag to the actual physical tag. Typically, tags are not connected to any user/owner when bought from the store. In order to take ownership of the tag, the user/owner must register themselves as owner of the tag before it is used. The owner of a tag may be permitted to relay any kind of permission to other users once registered. For instance, it may be useful to enable tags to be shared between family members.

Tag reader 110 may format and/or communicate the received tag transmissions to another computer, such as tag management server 120, over network 130. The transmissions may be included in a tag transmission report, which may include one or more tag IDs transmitted once or a number of times. Network 130 may be any network commonly employed to provide voice and data communications to subscribers.

According to various embodiments, tags may be clustered together and a single tag of the cluster may represent the cluster. For example, tags 102-108 may be clustered together such that only tag 106 broadcasts, while tags, 102, 104 and 108 do not broadcast and remain silent, receiving broadcasts from tag 106. Tag 106 becomes the master tag, while tags 102, 104 and 108 become slave or listener tags. This may save spectrum bandwidth, save energy in tags and mobile phones, increase anonymity of tags and/or minimize the risk falling victim to theft.

Figure 11:
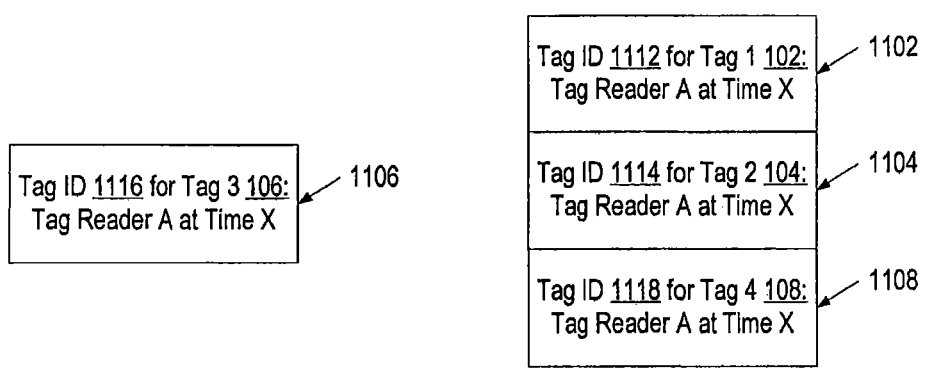
FIG. 11 is a schematic illustration of updating information of a tag cluster according to some embodiments.

If updated information is received for the master tag ID, this updated information is used to update stored information for the other tags of the tag cluster, as shown in FIG. 11.

Clustering is managed from a cloud service, such as tag management server 120, which may appoint a master tag for the cluster of tags. The cloud service, through tag management server 120, may send a control command to each listener tag. For example, tag management server 120 may send a control command to tag reader 110, which sends a control command to the listener tags to enter silent mode, or listen only mode. Such commands may be addressed specifically to the listener tags based on an identity of the listener tags. The master tag may not receive such a control command. The control command may also include an identity of the master tag.

Once a tag receives the control command and/or an identity of a master it will stop broadcasting and start listening for the master tag instead. It will become a listening tag. As long as the master tag is available and broadcasting, the listening tag will keep silent. In some embodiments, the master does not change its behavior.

A tag reader may then only transmit the master's single identity to the cloud service, or tag management server 120.

Figure 4:
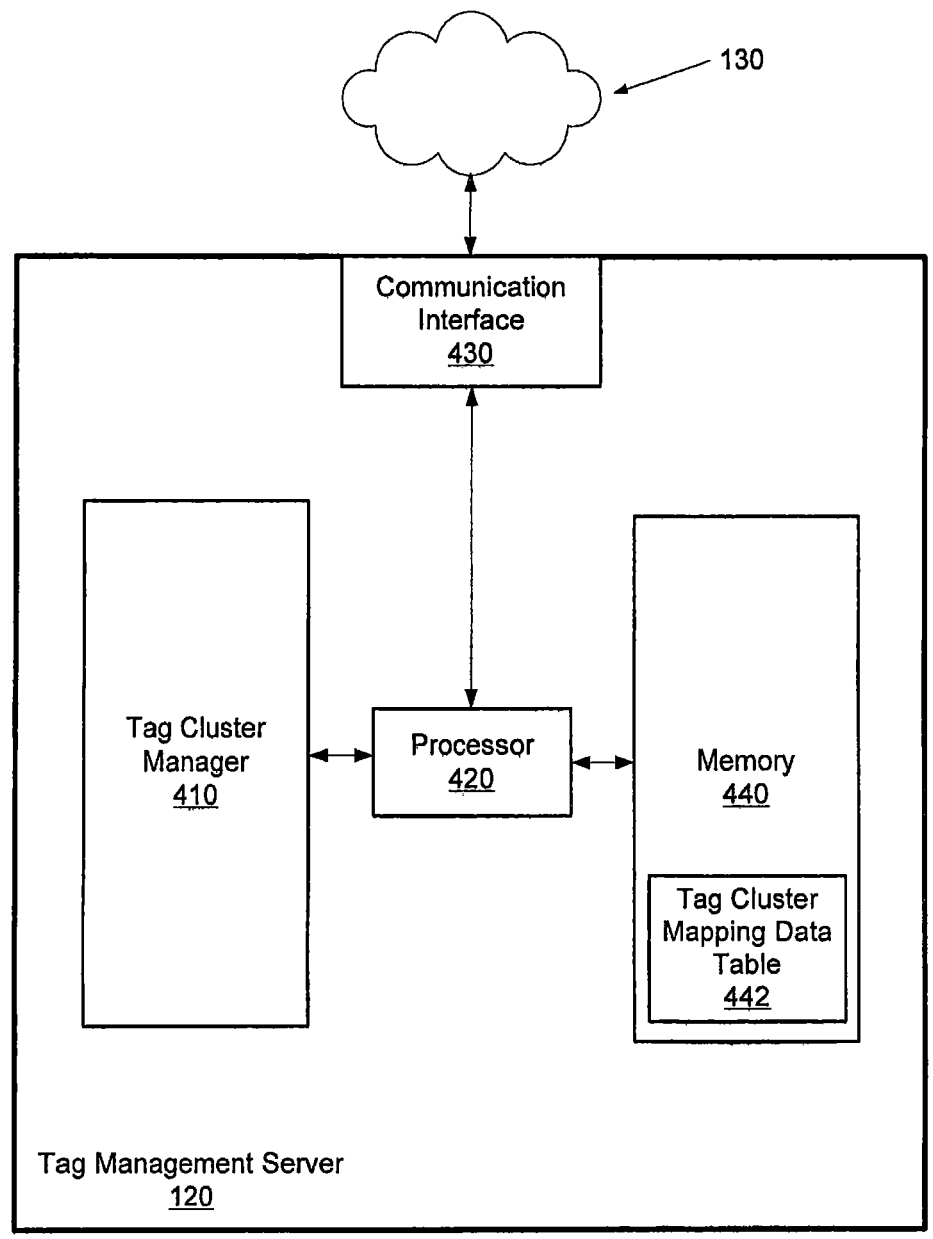
FIG. 4 is a schematic block diagram that illustrates a tag management server according to some embodiments.

FIG. 4 is a block diagram that illustrates a cloud service server, such as tag management server 120, according to some embodiments. Tag management server 120 may include a processor 420 to control a communication interface 430 that receives tag transmission reports from tag reader 110 over network 130.

Tag management server 120 may include a memory 440 including a data structure, such as tag cluster mapping data table 442, for storing a mapping of tags that belong to a cluster. This mapping may indicate which tag is the master tag, and indicate which tags are the listener tags. Such a mapping may include tag identification (IDs) of the tags and maybe a current location of the tags based on a current location of the master tag of the cluster. Tag cluster manager 410 may be configured to determine which tag may be a master tag and send out control commands to listener tags. Tag cluster manager 410 may select a master tag based on a number of factors, including the type of each tag, location of each tag in a cluster (more central location such that other tags may receive its broadcasts, how tags are installed, whether tags have a power source, a history of being a master tag, a location of a tag, whether the tag is stationary or mobile, or other factors involving the characteristics of the tags and the context of the tags.

Memory 440 may store computer program instructions that, when executed by the processor circuit 420, carry out the operations described herein and shown in the figures. The memory 440 can be a volatile memory or a non-volatile memory, such as EPROM (flash memory), that retains the stored data while power is removed from the memory 440.

Figure 7:
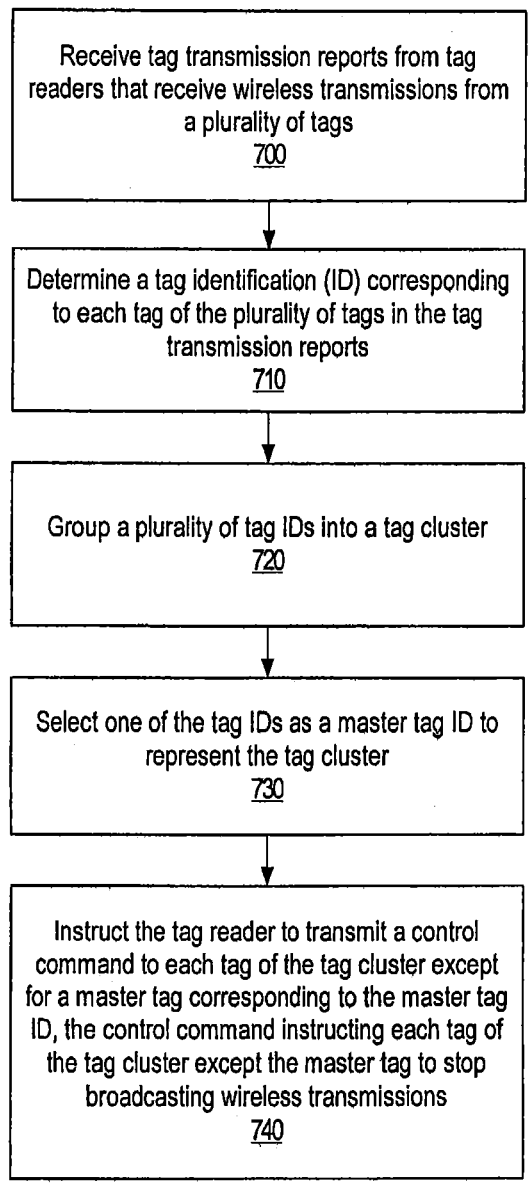
FIG. 7 is a flowchart that illustrates operations of a method for grouping tags into a cluster according to some embodiments.

FIG. 7 is a flowchart that illustrates operations of a method for clustering tags, according to some embodiments. In block 700, tag transmission reports are received from a tag sensor that receives wireless transmissions from a plurality of tags. The tag transmission reports may be received by a computing device of a remote service or cloud service, which may include one or more servers such as tag management server 120. Tag IDs of the tags in the transmission reports may be determined (block 710).

Tag management server 120 may group a plurality of the tag IDs into a tag cluster (block 720). A tag cluster may be two or more tags grouped together. One of the tag IDs of the tag cluster is selected as a master tag ID to represent the tag cluster (block 730). The tag corresponding to the master tag ID becomes the master tag.

Tag management server 120 instructs the tag reader to transmit a control command to each tag of the tag cluster except for a master tag corresponding to the master tag ID (block 740). The control command instructs each tag of the tag cluster except the master tag to stop broadcasting wireless transmissions. As a result, only transmissions from the master tag are received by the tag readers. Transmissions from the other tags of the tag cluster are not received.

As tag management server 120 knows that the master tag represents a whole cluster of tags, information about the master tag will cause tag cluster manager 410 to update information in data table 442 for the whole cluster of tags simultaneously. The cloud service will interpret a location update from the master as an update of the whole cluster. If the whole cluster of tags move, the master's new position will be reported to the cloud and all silent tags will also get their position updated by the cloud.

Figure 8:
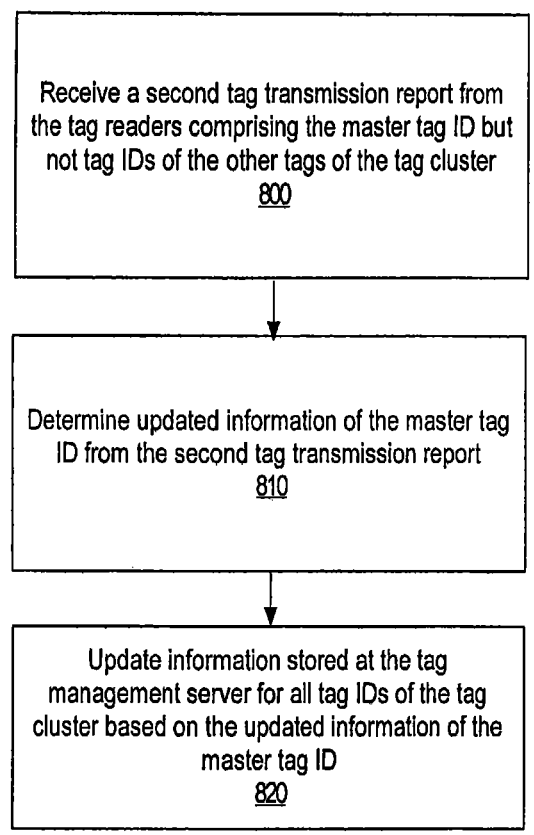
FIG. 8 is a flowchart that illustrates operations of a method for updating information of a tag cluster according to some embodiments.
Figure 9:
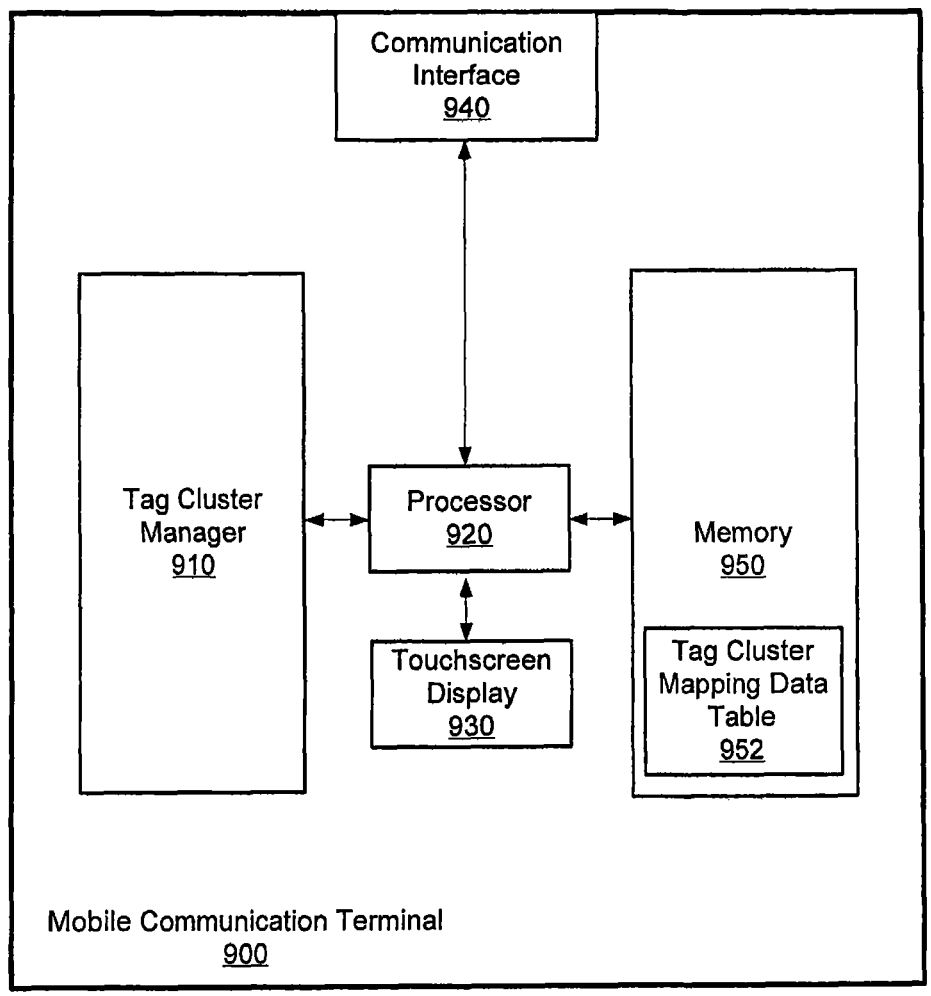
FIG. 9 is a schematic block diagram that illustrates a mobile communication terminal according to some embodiments.

For example, FIG. 8 is a flowchart that illustrates operations of a method for updating information for a tag cluster, according to some embodiments. In block 800, transmission reports are received from tag readers that include the master tag ID but not any other tag IDs of the tag cluster, for instance, as defined by a cluster mapping in data table 442.

Updated information is determined from the information associated with receiving the master tag ID (block 810). Information for all tag IDs of the tag cluster, including all tag IDs not the master tag ID, is updated based on the updated information of the master tag ID (block 820). Information may include locations and time of locations. Information may also include what tag readers detected what master tags at what times.

For example, FIG. 11 shows entries of a data structure maintained by tag management server 120, such as in tag cluster mapping data table 442, according to some embodiments. Entry 1106 shows that tag ID 1116 for tag 106, which is indicated as the selected master tag ID. Information of the master tag ID 1116 includes information that a transmission (or transmissions depending on the frequency of the transmissions) from master tag ID 1116 was detected at tag reader A at time X. As some tag transmissions are broadcast quite frequently, perhaps once a second, it is understood that embodiments may take into consideration the frequency of broadcasts and whether it is useful to perform such operations for every single broadcast or to consider broadcasts only during a specific period of time, time window, or number of broadcasts.

Entries 1102, 1106 and 1108 for tag IDs 1112, 1114 and 1118, respectively, are all the other tags that form a tag cluster that master tag ID 1116 represents. For example, master tag ID 1116 may be a tag in a car and tag IDs 1112, 1114 and 1118 may be correspond to tags placed on or embedded in a phone, a wallet and a laptop. All of these entries in the tag cluster mapping data table 442 are updated with the same information that updated entry 1106 of the master tag ID 1116. That is, all entries of the tag cluster indicate that they were detected by tag reader A at time X.

If a listening tag is separated from the cluster, it will cease to detect broadcasts from the master and start broadcasting as normal. When the cloud receives a broadcast from the separated tag, it will be understood that the listening tag has left the cluster and will update the cluster representation accordingly.

Figure 5:
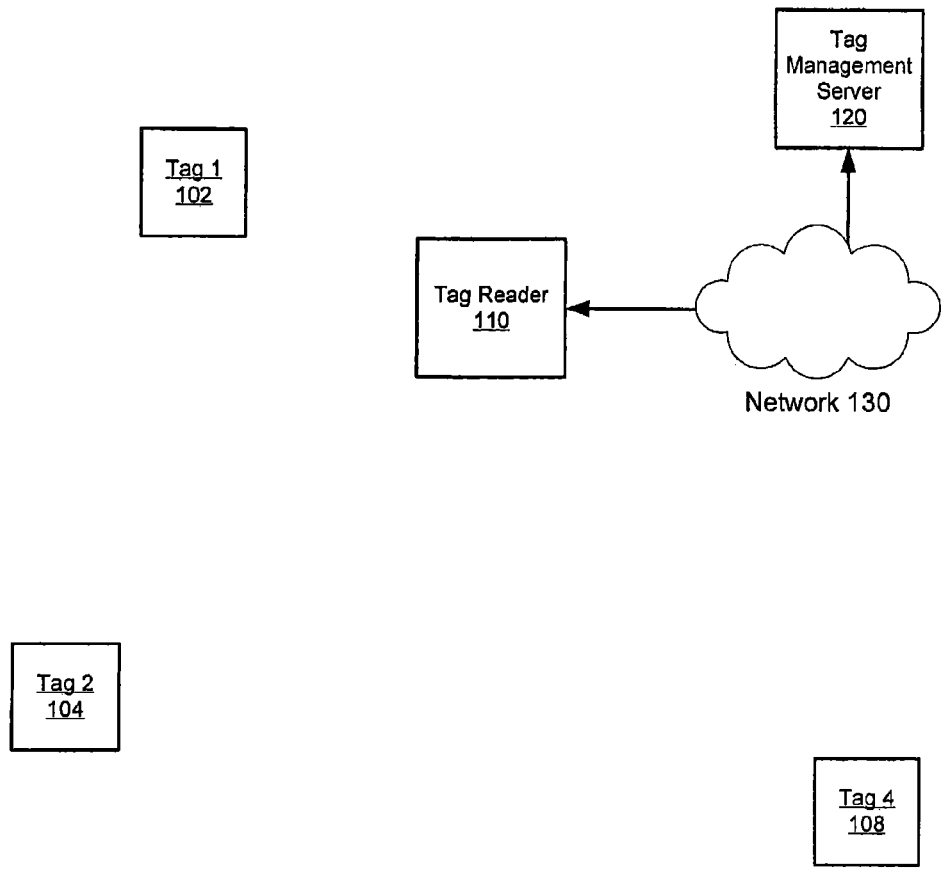
FIG. 5 is a schematic illustration of a missing master tag according to some embodiments.
Figure 6:
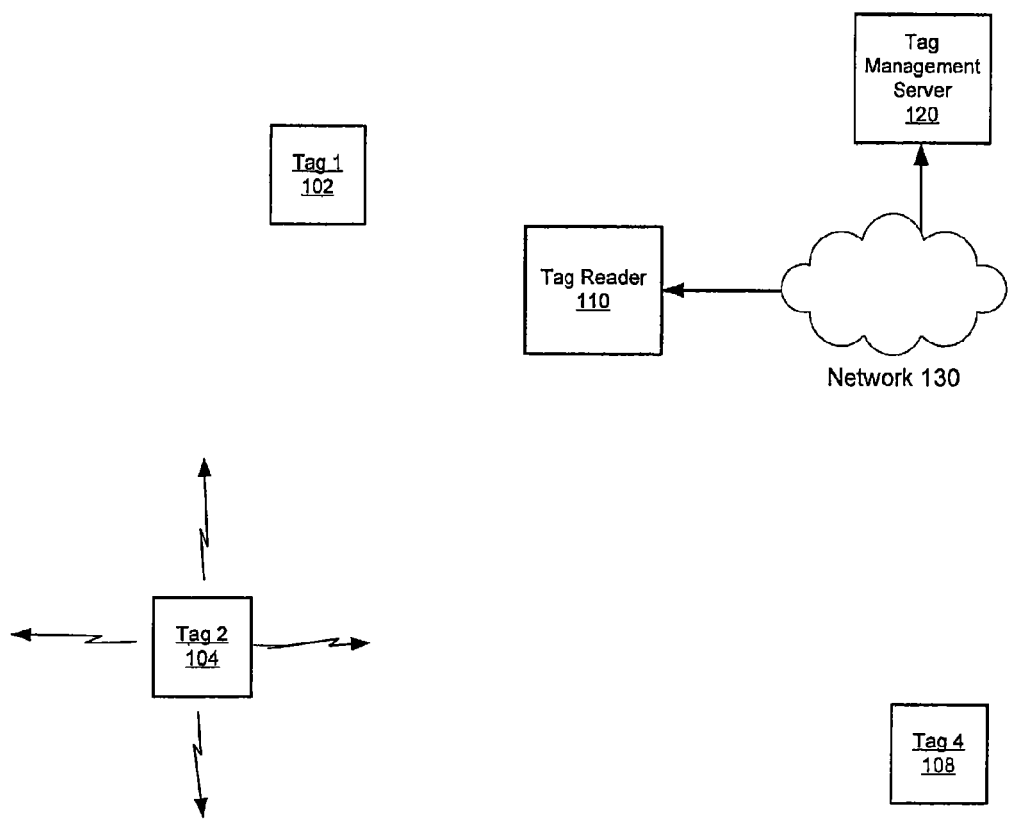
FIG. 6 is a schematic illustration of a new master tag according to some embodiments.

If the master is separated from the cluster, as shown by the disappearance of tag 106 in FIG. 5, the listening tags will detect a lack of broadcasting from master tag 106 over a threshold time and, responsive thereto, will start broadcasting as normal. In this case, the appointment of a new master tag is possible, such as tag 104 in FIG. 6.

When tag reader 110, which may be a mobile phone, reports a number of tags in one message, which may represent a similar location, tag management server 120 may determine that there is potential for clustering the tag together. Perhaps, there may be some decision to cluster tags based on certain conditions and a threshold for one or more conditions.

Figure 12:
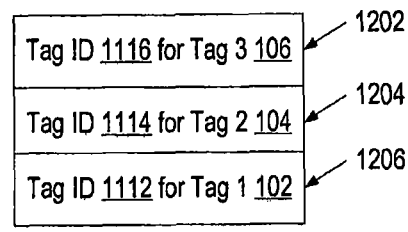
FIG. 12 is a schematic illustration of a master priority list according to some embodiments.

In a further example, tag management server 120 may specify a list of potential masters in priority order, as in the master priority list 1200 shown in FIG. 12. The listener tags may also serve as backup masters, and may be configured to automatically wake up if the master above them in the priority list becomes unavailable.

For example, tag management server 120 may determine and map three potential masters, tag IDs 1116, 1114 and 1112 for tags 106, 104 and 102, respectively. The highest priority tag ID is tag ID 1116 in list position 1202. Accordingly, tag 106 may be the primary master and remain broadcasting while others are silent. Tag 104, with tag ID 1114 in list position 1204, may be the secondary master and will listen only for tag 106. If it fails to hear tag 106, it may wake up and become the new master. Tag 102 may be a third master in the list, as tag ID 1112 in position 1206, and will listen to tag 106, then tag 104. If it fails to hear tag 106, then fails to hear tag 104, it may wake up and become the new master. In this example, tag 108 is only a listener tag. Tag cluster manager 410 of tag management server 120 may store this priority list in its data table and then share this priority list in a control command to the listener tags. This master priority list allows for the whole cluster to keep silent as long as any of the masters are still available in the cluster.

The tag cluster manager 410 may form the master priority list based on a number of factors, including a type of item that a tag is placed onto. This information may be obtained and stored in data table 442. For example, if the tag is used on an item that can contain other items (like a car, bag or house), it could have a higher priority value for selection as a master, because it will likely not move from the cluster unless the cluster of items moves along with it. In another example, if a tag is a static tag that has continuous access to power, such a tag could also be prioritized, because power consumption would not be an issue for this tag.

In some cases, the identity of a tag may be changed periodically, such as every hour. To avoid the need to recluster each time, as soon as a master changes its identity it is possible for the cloud service to send a list of future or alternate identities for each master to allow the cluster to be kept for a longer period. In this case all alternate identities for the first master should be listed in chronological order first in the priority master list, then all ID's for the secondary master and so on. This allows the cluster to persist even if the master changes its identity or leaves the cluster.

As one tag represent a whole tag cluster, two clusters can be merged by making one master a listener to another master. This can be a very effective way to re-organize cluster structure without the need to reconfigure every silent tag.

Embodiments have been described with identity tags, which can be clustered effectively. However, this concept is not limited to identity tags. Sensor or control tags can also make use of this clustering architecture. Most sensor applications may not require sensor data to be submitted every second. Therefore, a sensor can buffer sensor data internally and stay silent until the data needs to be uploaded. A data upload can be triggered from the tag itself or from the cloud service.

A tag may allow sensor data to be transmitted by leaving the listening mode and entering active broadcast mode. The cloud service may report back to the tag that sensor data has been received by using a control command. In this way, the tag can know when it is appropriate to go back to listening mode.

The cloud service can initiate a sensor upload using a wakeup message, which allows the tag to have "direct" contact with the cloud service (through a tag reader). This may make the tag report sensor data actively again. When the sensor data has been received, the cloud can make the tag a listener again using the same process described above.

A similar process can be performed for control tags. The cloud may have to wake the tag before a control command is sent to it. If the cloud knows that the command has been executed (through tag reader data), it can make the tag a listener tag again.

Figure 10:
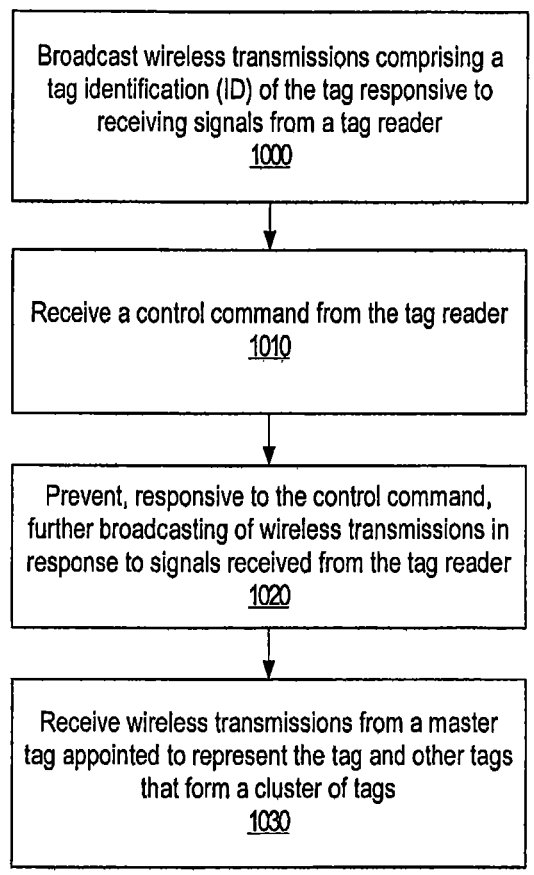
FIG. 10 is a flowchart that illustrates operations of a tag according to some embodiments.

Tags may operate as master tags or listener tags, according to some embodiments. A tag may be selected as a master tag and may continue to broadcast as normal. A listener tag may be commanded to be silent when grouped into a tag cluster. For example, FIG. 10 is a flowchart that illustrates operations of a tag of a tag cluster, according to some embodiments. A tag may broadcast wireless transmissions and the transmissions may include a tag ID of the tag (block 1000 of FIG. 10). However, the tag may receive a control command from the tag reader (block 1010). Responsive to the control command, the tag may prevent further broadcasting of wireless transmissions (block 1020). These transmissions may be in response to signals received by a tag reader. These transmissions may also be transmissions in a broadcast mode of the tag in response to a first signal of the tag reader but do not require a signal from the tag reader for every broadcast transmission.

The tag may receive wireless transmissions from the master tag that is selected or appointed to be the master tag (block 1030). It may expect to receive no other transmissions from tags of the tag cluster.

Tags may also make decisions independent of the cloud service, according to some embodiments. For example, when a listener tag receives a "become listener" message, it may receive an ordered list of identities, or master list, that the tag should listen for, instead of broadcasting. The list can include identities of different tags or several identities representing a single tag or any combination. While the listener tag receives broadcasts from the master tag at the top of the ID list, the listener tag will keep silent and only listen.

The tag will listen for broadcasts from the tag with an ID at the top of the list. If it cannot hear this master (for a certain timeout period), it may discard the identity and try to listen for a new master. When searching for a new master, a listener tag may increase or widen the listening window for a faster search. When a new broadcast is received, the master list may be searched to see if the broadcast originates from a new master. Identities above the found master ID may be discarded. When a new master is found, the tag can synchronize its listening window to the master again or narrow its listening window. This may provide for less transmission or the use of less power during normal operation. If no new master is identified for a certain period of time or for a certain listening window, the whole master list may be discarded and the tag will go back to its default broadcasting behavior.

The master broadcast message, may also include a wake-up message which wake up every listening tag or a subset of them. This wake-up message may be delivered at the command of the cloud service. Each listening tag must read the broadcast message to determine if it should wake up or not. A general wake-up message can be represented as a single bit or flag of the broadcast message, while a listener specific wake-up command must include the identity of the listener tag to wake up.

One way to make use of the clustering solution for mischief is to attach "virtual spy tags" on a cluster. A physical tag may be attached to the item to be tracked without authorization. The tag will be included in the cluster mapping as a listening tag. If the tag is unpowered, it will be silent forever, but still virtually part of the cluster mapping until the cluster mapping dissolves for other reasons.

This may make the tag impossible to scan for (because it does not physically exist in the cluster) and it would be impossible to remove or destroy. One way to handle this is to force re-clustering as soon as the master relocates. In this way the virtual spy tag will be excluded from the cluster mapping.

When an item is carried and later dropped, it is beneficial if the exact drop location is registered with the cloud service. However, this may be more efficient if the mobile phone of the person carrying the item had the functionality of tag management server 120. According to some embodiments, a mobile communication terminal 900 may perform the functions of tag management server 120. For example, mobile communication terminal 900 may act as a tag reader and receive tag transmissions through communication interface 940. Tag IDs may be determined for the tags. Processor 920 may cause tag ID association comparator 910 to perform comparisons between tag IDs and association information stored in a data structure in memory 950, such as tag ID association data table 952. A notification may be generated when a comparison indicates that one or more tag IDs are not associated with the other tag IDs.

The mobile communication terminal 900 may also receive configuration information and provide detection information through touchscreen display 930. Mobile communication terminal 900 may also include ownership information for the mobile communication terminal 900 in data table 952. In some cases, mobile communication terminal 900 may itself include a tag with ID information that uniquely identifies the mobile communication terminal 900.

For silent tags, an exact location might not be registered for a location of a dropped item because the dropped item may not start to broadcast before it is out of range of the master and possibly also the tag reader. Additionally, RSSI signal strength may not be able to improve the precision of the drop location because the tag is silent as the owner moves away from it. However, this may not be a huge problem if the person owns the item that was dropped. In this situation, a "connected" link to the tag may be used such that a broken connection, or link-loss, is detected when an item is dropped. In connected mode, the signal strength may also be monitored continuously.

As described above, a cloud service, including tag management server 120, may organize and manage the tags. In other embodiments, tags may self-organize into clusters. In this architecture, tags periodically listen for other tags and can communicate with close-by tags to determine if it can become a listener. For example, each tag listens for other tags periodically. If a tag can hear another tag, it can determine to become a listener tag to the other tag. It does so by communicating its identity to the other tag, which becomes a master. Masters may keep a list of all listener tags it reports. Because the cloud service may not know about this self-organized cluster, all listener tag identities may be reported to the cloud service (from the master tag) to allow the cloud service to know about all tags in the cluster.

A tag broadcast with more than one identity may indicate that the tag is a master. When a master and single broadcasting tags detect one another, the single broadcasting tags may become the listener tags to the master tag to avoid reconfiguration.

Masters may know not when listener tags leave the cluster. But as listener tags will turn into active tags as soon as the master is lost, the cloud service will understand that the listener tag has moved out of the cluster. In some cases, the cloud service may report back to the masters (through a control command) to allow it to remove the missing listener tag from any list or mapping.

Alternatively, a maximum lifetime of masters may be used to allow the cluster to reconfigure. When the master wants to demote itself, perhaps for power usage reasons, it may discard its list of listener tags and become a single broadcasting tag. Listener tags may detect this change when their tag ID is not present as part of the original masters broadcast. This, in turn, allows them to reconfigure to active, broadcasting tags.

In some cases, a cloud service may prioritize a broadcast from a single broadcasting tag over the same tag represented as a listening tag reported from a master tag.

According to some embodiments, only tags are broadcasting. Tag readers, which may include smartphones, provide information from the cloud service to the tags by addressing specific listener tags. A tag address may be its current broadcast identity. Tag readers may get a number of broadcasts, including tag identities, and are able to send a control message to each of these specific listener tags.

The cloud service may maintain a database and a tag reader may not have to maintain constant communication with the cloud service. Rather, the cloud service may send control messages and/or instructions to tag readers. It may not matter which tag reader or smart phone delivers control messages to the tags. It may not be the same tag reader that receives transmissions and delivers control messages as the cloud service may control the tags.

Although the cloud service may control the tags, the cloud service may not need to be involved when masters are leaving a tag cluster if there are multiple tags that may become masters, according to some embodiments. No reorganization of cluster or communication with the cloud service may be necessary if a master leaves. The cloud service may instruct the tags as to how to independently reorganize and operate when one or more masters leave the tag cluster. For example, if there are 10 cars in a parking garage and all have tags, one is a master. If the car with the master tag drives away, another tag will become the master tag. It will start broadcasting and all other tags will listen.

A cloud service may select one or more master tags by comparing tag IDs and information associated with the tag IDs. Tags can have different capabilities and information about these capabilities may be stored by the cloud service in a data table. Criteria for master selection may include whether a tag has a power supply. If a tag has a power supply, it may be better suited to be master. Some tags may be installed into certain devices at the time of manufacture of the devices or when the device is upgraded. Such devices may also have information that may indicate that they may be better masters. For example, some tags may be installed in cars and may be a better master than moveable items in the car.

Some tags may become masters because they are in a better position to receive the other tag transmissions. For example, the best tag may likely be in the middle of a cluster of all tags that can receive transmissions from the middle tag. Tags can be chosen based on various other conditions and characteristics.

If tag clusters merge, the cloud service may decide which master tag or other tag is the new master tag of the merged cluster.

The cloud service may also force re-clustering when a master relocates in order to shed a spy tag. To do so, the cloud service may send a wake-up control message to all listener tags. In some cases, the cloud service may only have contact with the master tag as only the master tag broadcasts transmissions. So to wake a tag cluster, the cloud service may only need to send a control message to the master tag, which in turn sends a wake up message to all the listener tags. The master tag may continue to send broadcasts but let the cloud service specify, in a control command, a flag or the like in the broadcast message to wake up the listener tags. The master tag may modify the control command from the cloud service and send a wake up command to all listeners. Tags that are woken up (wake up flag) wake up and become normal broadcasting tags. After that, the tags can recluster and the process starts all over again.

A spy tag may really be a virtual tag, rather than a physical tag. A cloud service may be tricked into including the virtual tag in a cluster mapping. For example, a tag may start up and be included in the cluster, then its battery may be removed. Then, if the master tag moves, the cloud service may keep mapping with the spy tag, even though a physical tag is no longer there. If reclustering occurs, the tag may not be included in the new tag cluster.

If one of a thousand tags leaves a cluster, it will not hear the master anymore and will start broadcasting. The cloud service will know when the tag broadcasts so it will remove it from the cluster mapping.

Tags may listen during a window of time rather than continuously, which would drain its power. Listening tags may synchronize its listening window with the master tag's broadcasts. When a listener tag no longer receives transmissions from a master tag during a listening window, it may extend the window for a certain time period to better hear a secondary master tag. If the listener tag still does not detect transmissions of a master tag, it may start broadcasting. If it receives a transmission with a new master tag ID, it may synchronize the time window with the new master tag broadcast window. A secondary master tag may also be instructed to keep the timing window of the first master tag so all other listener tags need not adjust their listening windows.

In some embodiments, if a secondary master tag observes no broadcast transmissions from a primary master, the secondary master tag may become the primary master tag and may take on that timing window. The tag may not need to extend its listening window.

The transmissions may be transmitted in a tag transmission report. The tag transmission report may be a single transmission to server 120 or a number of transmissions to server 120 over a period of time. A tag transmission report may include one or more tag IDs. According to some embodiments, tag reader 110 or server 120 can determine location information (or have location information determined), using for example GPS, which may be provided to a location service/computer server (location server) where this location information may be associated with the ID Information for each moveable object. As the location information is periodically determined, it can be used to update the location information for the moveable objects. The location information can also include a time and/or history for each location of the moveable object.

The embodiments described herein provide various advantages. There have been reported incidents of thieves scanning cars at parking areas to see if there are transmitters in the cars. The presence of a transmitter may indicate that a valuable device is located inside the car. If a car has a tag that broadcasts, no other tag representing a device in the car needs to be broadcasting. Therefore, when tagged keys, a tagged wallet and a tagged laptop enter a car, the devices go into silent mode as long as they receive wireless transmissions from the master tag of the car. Potential thieves cannot detect if there are more things available in the car, since only the car tag will be broadcasting. Also, as a result, there will be fewer transmissions in a parking garage. In some cases, static tags in parking lots may act as masters for all cars and their items.

Embodiments described herein may also provide for improved power efficiency. Since silent tags do not broadcast, their batteries will last longer. Also a more silent environment with fewer broadcasts will also wake up the mobile phones in the surrounding less often and will cause significantly less communication towards the telecom network. This may decrease the load on the network, the amount of data that needs to be sent and lower the fee for any subscription. This will put lower stress on the mobile phone power consumption and subscription data fee.

It is to be understood that the present invention is not limited to the particular configuration shown in FIGS. 1 through 12, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture of FIGS. 1 through 12 may be implemented as a single processor system or a multi-processor system in accordance with various embodiments of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A tag management server for grouping a plurality of tags, the server comprising:
   a processor;
   a communication interface coupled to the processor;
   a memory coupled to the processor and comprising computer readable program code embodied in the memory that when executed by the processor causes the processor to perform operations comprising:
   receiving, at the communication interface, one or more tag transmission reports from one or more tag readers that receives wireless transmissions from the plurality a tags;
   determining a tag identification (ID) corresponding to each tag of the plurality of tags in the one or more tag transmission reports;
   grouping a plurality of the tag IDs into a tag cluster;
   selecting one of the tag IDs as a master tag ID to represent the tag cluster; and
   instructing the one or more tag readers to transmit a control command to each tag of the tag cluster except for a master tag corresponding to the master tag ID, the control command instructing each tag of the tag cluster except the master tag to stop broadcasting wireless transmissions.

2. The server of claim 1, wherein the one or more tag transmission reports comprises a first transmission report comprising tag IDs for wireless transmissions from the plurality of tags, and wherein the operations further comprise receiving a second tag transmission report from the one or more tag readers comprising the master tag ID but not tag IDs of other tags of the tag cluster.

3. The server of claim 2, wherein the operations further comprise:
   determining updated information of the master tag ID from the second tag transmission report; and
   updating information stored at the tag management server for all tag IDs of the tag cluster based on the updated information of the master tag ID.

4. The server of claim 1, wherein the control command comprises instructions for each tag of the tag cluster except the master tag to listen for broadcasts from the master tag.

5. The server of claim 1, wherein the control command comprises a master priority list comprising a prioritized list of tag IDs of the tag cluster, wherein a tag of the tag cluster becomes the master tag according to a priority of the corresponding tag ID in the master priority list.

6. The server of claim 5, wherein the master priority list comprises a plurality of alternate IDs for each tag ID in the master priority list, wherein each tag of the tag cluster that is not the master tag listens for wireless transmissions of a highest priority tag ID and alternate ID.

7. The server of claim 6, wherein the control command further comprises instructions for the master tag to broadcast during a broadcast time window and for any other tags to listen during the broadcast time window.

8. The server of claim 1, wherein the operations further comprise instructing the one or more tag readers to transmit a wake command to the master tag, the wake command instructing the master tag to include a wake up flag in a wireless transmission to cause other tags of the tag cluster not broadcasting wireless transmissions to resume broadcasting wireless transmissions.

9. A mobile communication terminal for grouping a plurality of tags, the mobile communication terminal comprising:
   a processor;
   a communication interface coupled to the processor;
   a memory coupled to the processor and comprising computer readable program code embodied in the memory that when executed by the processor causes the processor to perform operations comprising:
   receiving, at the communication interface, wireless transmissions from the plurality of tags;
   determining a tag identification (ID) corresponding to each tag of the plurality of tags from the wireless transmissions;
   grouping a plurality of the tag IDs into a tag cluster;
   selecting one of the tag IDs as a master tag ID to represent the tag cluster; and
   transmitting a control command to each tag of the tag cluster except for a master tag corresponding to the master tag ID, the control command instructing each tag of the tag cluster except the master tag to stop broadcasting wireless transmissions.

10. The mobile communication terminal of claim 9, wherein the wireless transmissions of the plurality of tags comprise tag IDs, and wherein the operations further comprise receiving wireless transmissions from the master tag but not from other tags of the tag cluster.

11. The mobile communication terminal of claim 10, further comprising:
    determining updated information of the master tag ID from the wireless transmissions from the master tag; and
    updating information stored at the mobile communication terminal for all tag IDs of the tag cluster based on the updated information of the master tag ID.

12. The mobile communication terminal of claim 9, wherein the control command comprises instructions for each tag of the tag cluster except the master tag to listen for broadcasts from the master tag.

13. The mobile communication terminal of claim 9, wherein the control command comprises a master priority list comprising a prioritized list of tag IDs of the tag cluster, wherein a tag of the tag cluster becomes the master tag according to a priority of the corresponding tag ID in the master priority list.

14. A tag comprising:
    a communication interface coupled to the processor that is configured to receive and transmit wireless transmissions;
    a digital logic circuit configured to perform operations comprising:
    broadcasting wireless transmissions comprising a tag identification (ID) of the tag responsive to receiving signals from a tag reader;
    receiving a control command from the tag reader;
    preventing, responsive to the control command, further broadcasting of wireless transmissions in response to signals received from the tag reader; and receiving wireless transmissions from a master tag appointed to represent the tag and other tags that form a cluster of tags.

15. The tag of claim 14, wherein the operations further comprise resuming broadcasting of the wireless transmissions responsive to no longer detecting wireless transmissions from the master tag within a listening time window.

16. The tag of claim 15, wherein the operations further comprise widening the listening time window responsive to no longer detecting wireless transmissions from the master tag during the listening time window.

17. The tag of claim 16, wherein the operations further comprise narrowing the listening time window responsive to receiving wireless transmissions from a new master tag during the widened listening time window.

18. The tag of claim 14, wherein the control command further comprises a master priority list comprising a prioritized list of tag IDs, and wherein the operations further comprise:
   listening for wireless transmissions from a tag having a tag ID matching a highest priority tag ID in the master priority list; and
   responsive to detecting no wireless transmissions from the master tag having a tag ID matching a highest priority tag ID in the master priority list during a listening time window, discarding the highest priority tag ID in the master priority list and listening for wireless transmissions from a tag having a tag ID matching a new highest priority tag ID in the master priority list.

19. The tag of claim 18, wherein the operations further comprise:
   broadcasting wireless transmissions responsive to detecting no wireless transmissions from a tag having a tag ID matching a priority tag ID in the master priority list during the listening time window.

20. The tag of claim 18, wherein the master priority list comprises a plurality of alternate IDs for each tag ID in the master priority list, and wherein the operations further comprise:
   listening for wireless transmissions from a tag having a tag ID and an alternate ID matching a highest priority tag ID and alternate ID in the master priority list; and
   responsive to detecting no wireless transmissions from the master tag having a tag ID and an alternate ID matching a highest priority tag ID and alternate ID in the master priority list during the listening time window, discarding the highest priority tag ID and alternate ID in the master priority list and listening for wireless transmissions from a tag having a tag ID matching the highest priority tag ID and a new alternate ID in the master priority list.

* * * * *